(12) United States Patent
Fujihara (10) Patent No.: US 10,978,694 B2
(45) Date of Patent: *Apr. 13, 2021

(54) POSITIVE ELECTRODE MATERIAL FOR NON-AQUEOUS SECONDARY BATTERIES, NON-AQUEOUS SECONDARY BATTERY, AND METHOD FOR PRODUCING POSITIVE ELECTRODE MATERIAL FOR NON-AQUEOUS SECONDARY BATTERIES

(71) Applicant: NICHIA CORPORATION, Anan (JP)

(72) Inventor: Keisuke Fujihara, Tokushima (JP)

(73) Assignee: NICHIA CORPORATION, Anan (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/856,651

(22) Filed: Apr. 23, 2020

(65) Prior Publication Data

US 2020/0251722 A1 Aug. 6, 2020

Related U.S. Application Data

(63) Continuation of application No. 15/852,881, filed on Dec. 22, 2017, now Pat. No. 10,673,067.

(30) Foreign Application Priority Data

Dec. 27, 2016 (JP) .............................. JP2016-253519

(51) Int. Cl.
  *H01M 4/36* (2006.01)
  *H01M 4/525* (2010.01)
  (Continued)

(52) U.S. Cl.
  CPC .............. *H01M 4/36* (2013.01); *H01M 2/16* (2013.01); *H01M 4/0471* (2013.01);
  (Continued)

(58) Field of Classification Search
  None
  See application file for complete search history.

(56) References Cited

U.S. PATENT DOCUMENTS 10,411,259 B2   9/2019  Fujihara
10,673,067 B2 *  6/2020  Fujihara ................ H01M 10/05
(Continued)

FOREIGN PATENT DOCUMENTS

JP   H05132363 A1   5/1993
JP   H10280155      10/1998
(Continued)

*Primary Examiner* — Rena Dye Cronin
(74) *Attorney, Agent, or Firm* — Hunton Andrews Kurth LLP (57) ABSTRACT

A method for producing a positive electrode material for non-aqueous secondary batteries includes: performing a heat treatment on zirconium boride particles in an oxygen-containing atmosphere at a heat treatment temperature of not less than 220° C. and not more than 390° C., thereby obtaining heat-treated particles; and mixing the heat-treated particles with a positive electrode active material which contains a lithium transition metal complex oxide particles including at least one of cobalt and nickel in a composition thereof and having a layered structure, such that a content of the heat-treated particles relative to the lithium transition metal complex oxide particles is, as zirconium, not less than 0.25 mol % and not more than 2.2 mol %, thereby obtaining a positive electrode material for non-aqueous secondary batteries.

7 Claims, 1 Drawing Sheet

(51) Int. Cl.
  *H01M 4/04* (2006.01)
  *H01M 4/131* (2010.01)
  *H01M 4/62* (2006.01)
  *H01M 4/139* (2010.01)
  *H01M 10/0569* (2010.01)
  *H01M 10/05* (2010.01)
  *H01M 2/16* (2006.01)
  *H01M 4/02* (2006.01)

(52) U.S. Cl.
  CPC ........... *H01M 4/131* (2013.01); *H01M 4/139* (2013.01); *H01M 4/364* (2013.01); *H01M 4/525* (2013.01); *H01M 4/62* (2013.01); *H01M 10/05* (2013.01); *H01M 10/0569* (2013.01); *H01M 2004/028* (2013.01); *H01M 2300/0028* (2013.01)

(56) References Cited

U.S. PATENT DOCUMENTS

| | | | | |
|---|---|---|---|---|
| 2012/0052392 | A1* | 3/2012 | Takeuchi | C01G 53/50 429/223 |
| 2013/0277604 | A1* | 10/2013 | Shimokita | H01M 4/505 252/182.1 |
| 2016/0285073 | A1 | 9/2016 | Fujita et al. | |

FOREIGN PATENT DOCUMENTS

| | | |
|---|---|---|
| JP | 2012-048838 A | 3/2012 |
| JP | 2013015488 A | 1/2013 |
| JP | 2013-239434 A | 11/2013 |
| JP | 2013-254692 A | 12/2013 |
| JP | 2016-186933 A | 10/2016 |

\* cited by examiner

POSITIVE ELECTRODE MATERIAL FOR NON-AQUEOUS SECONDARY BATTERIES, NON-AQUEOUS SECONDARY BATTERY, AND METHOD FOR PRODUCING POSITIVE ELECTRODE MATERIAL FOR NON-AQUEOUS SECONDARY BATTERIES

CROSS-REFERENCE TO RELATED APPLICATION

This is a continuation application of U.S. patent application Ser. No. 15/852,881, filed Dec. 22, 2017, which claims priority to Japanese Patent Application No. 2016-253519, filed on Dec. 27, 2016, the disclosure of which is hereby incorporated by reference in its entirety.

BACKGROUND

The present disclosure relates to a positive electrode material for non-aqueous secondary batteries, a non-aqueous secondary battery, and a method for producing a positive electrode material for non-aqueous secondary batteries.

Non-aqueous secondary batteries, such as lithium ion secondary batteries, have been commonly used as a power source for small-sized devices such as mobile phones, notebook computers, etc. The use of non-aqueous secondary batteries as a power source for large-sized machines, such as electric vehicles, has been studied because the average operation voltage of the non-aqueous secondary batteries can be raised.

Japanese Patent Publication No. 2012-048838 discloses using, as an active material, lithium-containing transition metal complex oxide particles in which at least one of titanium boride and zirconium boride is sintered on the particle surface. According to Japanese Patent Publication No. 2012-048838, the boride particles function as an electrical conduction assisting agent, and the boride particles are sintered on the surface of the lithium transition metal complex oxide particles. Therefore, these particles are unlikely to separate even if the charge/discharge cycle is repeated, so that the effect of improving the electrical conductivity can be maintained. Thus, the boride particles have excellent output characteristic.

SUMMARY

The present disclosure provides a positive electrode material for non-aqueous secondary batteries which has excellent cycle characteristic and a non-aqueous secondary battery.

A method for producing a positive electrode material for non-aqueous secondary batteries according to one embodiment of the present disclosure includes: performing a heat treatment on zirconium boride particles in an oxygen-containing atmosphere at a heat treatment temperature of not less than 220° C. and not more than 390° C., thereby obtaining heat-treated particles; and mixing the heat-treated particles with a positive electrode active material comprising lithium transition metal complex oxide particles that comprise at least one of cobalt and nickel in a composition thereof and have a layered structure, such that a content of the heat-treated particles relative to the lithium transition metal complex oxide particles is, as zirconium, not less than 0.25 mol % and not more than 2.2 mol %, thereby obtaining a positive electrode material for non-aqueous secondary batteries.

A positive electrode material for non-aqueous secondary batteries according to another embodiment of the present disclosure includes:

zirconium boride particles; and a positive electrode active material which contains a lithium transition metal complex oxide particles including at least one of cobalt and nickel in a composition thereof and having a layered structure, wherein: zirconium boride particles comprise an oxygen component in a content of not less than 1.1 mass % and not more than 1.4 mass %; and a content of the zirconium boride particles relative to the lithium transition metal complex oxide particles is, as zirconium, not less than 0.25 mol % and not more than 2.2 mol %.

When a positive electrode material for non-aqueous secondary batteries according to an embodiment of the present disclosure is used, a non-aqueous secondary battery which has excellent cycle characteristic can be realized.

DETAILED DESCRIPTION

One possible way to increase the energy density of a non-aqueous secondary battery is to charge the non-aqueous secondary battery with a higher charging voltage. It was found that, in a non-aqueous secondary battery in which a positive electrode material for non-aqueous secondary batteries is used which contains lithium transition metal complex oxide particles including at least one of cobalt and nickel in a composition thereof and having a layered structure, use of a high voltage at 4.44 V, as compared with a common charging voltage at 4.2 V, can lead to a serious deterioration in cycle characteristic.

In our estimation, one of the causes of the deterioration in cycle characteristic is that a fluoric compound contained in a solvent and an electrolyte which are constituents of a non-aqueous electrolytic solution gradually decomposes due to the high charging voltage, and the fluoride ions (hydrogen fluoride) generated react with a positive electrode material. Therefore, one possible way to suppress deterioration in cycle characteristic is to capture fluoride ions which are gradually generated during repetition of charging and discharging. Based on such research and detailed experiments, the present inventor conceived a novel positive electrode material for non-aqueous secondary batteries. Hereinafter, a positive electrode material for non-aqueous secondary batteries, a non-aqueous secondary battery and a method for producing a positive electrode material for non-aqueous secondary batteries according to the present disclosure, will be described.

An embodiment which will be described in the following is merely an exemplification of the technical concept of the present invention. The present invention is not limited to a positive electrode material for non-aqueous secondary batteries and a producing method thereof which will be described in the following. In this specification, the term "step" includes not only an independent step but also a step which is not clearly distinguishable from the other steps so long as a certain purpose of that step is accomplished. When a plurality of substances in a composition fall under a single constituent of the composition, the amount of that constituent in the composition means the total amount of the plurality of substances in the composition unless otherwise specified. Each of the average particle diameter of the lithium transition metal complex oxide particles and the average particle diameter of the zirconium boride particles refers to the center grain size of the lithium transition metal complex oxide particles or the zirconium boride particles, which corresponds to the volume accumulation of 50% from the smaller diameter side of the granularity distribution obtained by a laser scattering method.

(Positive Electrode Material for Non-Aqueous Secondary Batteries)

A positive electrode material for non-aqueous secondary batteries of the present disclosure includes a positive electrode active material and zirconium boride particles. Hereinafter, the positive electrode material for non-aqueous secondary batteries is described in detail.

[Positive Electrode Active Material]

The positive electrode active material includes lithium transition metal complex oxide particles containing a lithium transition metal complex oxide. The transition metal is at least one of cobalt and nickel. The lithium transition metal complex oxide particles have a layered structure which has a space which is capable of insertion and extraction of lithium ions. The lithium transition metal complex oxide particle may have a composition represented by formula (1):

(1)

$$Li_a Ni_x Co_y M1_z M2_w O_2 \quad (1)$$

where $0.95 \le a \le 1.5$,
$0 \le x \le 1$,
$0 \le y \le 1$,
$x+y \ne 0$,
$0 \le z \le 0.35$,
$0 \le w \le 0.02$,
$x+y+z+w \le 1$,
M1 is at least one element selected from Al and Mn, and
M2 is at least one element selected from the group consisting of Mg, Ti, Zr, W, Ta, Nb and Mo.

In the lithium transition metal complex oxide particle, there is a tendency that, as the amount of lithium increases, the output characteristic improves, while the difficulty in synthesis of the lithium transition metal complex oxide increases. In consideration of this point, the range of the value a in the composition formula (1) of the lithium transition metal complex oxide is set to $0.95 \le a \le 1.5$. The range of the value a is preferably $0.98 \le a \le 1.25$, more preferably $1 \le a \le 1.15$.

The lithium transition metal complex oxide includes at least one of cobalt and nickel as the transition metal. From the viewpoint of the cost and the structural stability of the lithium transition metal oxide during charging at a high voltage, the ranges of the values x and y in the composition formula (1) of the lithium transition metal complex oxide are set to $0 \le x \le 1$ and $0 \le y \le 1$, respectively. When the lithium transition metal complex oxide includes cobalt, the structure of the lithium transition metal oxide is stable even during charging at a high voltage, although the cost is high. Therefore, the ranges of the values x and y are preferably $0 \le x \le 0.2$ and $0.8 \le y \le 1$, more preferably $0 \le x \le 0.1$ and $0.9 \le y \le 1$. When the lithium transition metal complex oxide includes nickel, the structure of the lithium transition metal oxide is somewhat unstable during charging at a high voltage, although the cost is low as compared with the case where the lithium transition metal complex oxide includes cobalt. Therefore, the ranges of the values x and y preferably satisfy $0.3 \le x \le 0.8$ and $0.1 \le y \le 0.45$, more preferably $0.3 \le x \le 0.65$ and $0.2 \le y \le 0.4$.

The lithium transition metal complex oxide can contain at least one element M1 selected from the group consisting of aluminum and manganese. From the viewpoint of the charging/discharging capacity and the structural stability of the lithium transition metal oxide, the range of the value z in the composition formula (1) of the lithium transition metal complex oxide is set to $0 \le z \le 0.35$. When the lithium transition metal complex oxide includes cobalt, the ranges of the values x, y and z are preferably $0 \le x \le 0.2$, $0.8 \le y \le 1$ and $0 \le z \le 0.1$, more preferably $0 \le x \le 0.1$, $0.9 \le y \le 1$ and $0 \le z \le 0.05$. When the lithium transition metal complex oxide includes nickel, the ranges of the values x, y and z are preferably $0.3 \le x \le 0.8$, $0.1 \le y \le 0.45$ and $0 \le z \le 0.35$.

The lithium transition metal complex oxide can further contain at least one element M2 selected from the group consisting of magnesium, titanium, zirconium, tungsten, tantalum, niobium and molybdenum. The amount of element M2 contained in the lithium transition metal complex oxide can be appropriately determined in consideration of the characteristics required of non-aqueous secondary batteries. Note that, however, the amount of contained element M2 is preferably not so large because, if otherwise, the capacity decreases. In consideration of this point, the range of the value w in the composition formula (1) of the lithium transition metal complex oxide is set to $0 \le w \le 0.05$. When the balance between various characteristics is considered, the range of the value w is preferably $0 \le w \le 0.020$.

The positive electrode active material may contain, as a minor constituent, lithium transition metal complex oxide particles whose structure is different from the layered structure that is capable of insertion and extraction of lithium ions. Examples of the non-layered lithium transition metal complex oxide particles include a lithium manganese complex oxide which has a spinel structure and a lithium iron phosphate which has an olivine structure. The content of the layered lithium transition metal complex oxide which is contained in the positive electrode active material and which is represented by the composition formula (1) is, for example, not less than 90 mass %, preferably not less than 95 mass %. When the positive electrode active material contains a non-layered lithium transition metal complex oxide, the content of the non-layered lithium transition metal complex oxide is, for example, not more than 10 mass %, preferably not more than 5 mass %.

From the viewpoint of the fillability of the active material layer, the average particle diameter of the lithium transition metal complex oxide particles is, for example, not less than 3 μm and not more than 45 μm, preferably not less than 5 μm and not more than 35 μm.

[Zirconium Boride Particles]

In the positive electrode material for non-aqueous secondary batteries of the present disclosure, the zirconium boride particles are estimated to have the function of capturing fluoride ions which are one of the products of decomposition of the non-aqueous electrolytic solution. Specifically, the zirconium boride particles dissolve into the non-aqueous electrolytic solution and react with fluoride ions in the non-aqueous electrolytic solution, thereby generating $BF_4^-$ ions, so that the fluoride ions are deactivated. Since decomposition of the non-aqueous electrolytic solution advances gradually by repetition of charging and discharging of the non-aqueous secondary battery, it is preferred that the zirconium boride particles also gradually dissolve into the non-aqueous electrolytic solution and exhibit the function of capturing fluoride ions even when the charge/discharge cycle is repeated.

Thus, the zirconium boride particles contain oxygen. It is estimated that the oxygen contained in the zirconium boride particles is present in the form of zirconium oxide, or the like, at the particles surface, for example, and can therefore control the dissolution rate of zirconium boride into the non-aqueous electrolytic solution. It is also estimated that, due to the presence of zirconium oxide, or the like, at the surface of the zirconium boride particles, chemical reactions between the positive electrode active material and the zirconium boride particles and physical changes are suppressed in production of the positive electrode material.

From the viewpoint of generation of $BF_4^-$ ions, using titanium boride particles which contain oxygen in place of the zirconium boride particles can be considered. However, when titanium boride particles which contain oxygen are used, the initial charging/discharging characteristics deteriorate as compared with a case where the zirconium boride particles are used at the charging voltage of 4.44 V. Therefore, zirconium boride is an excellent boron compound.

The content of the oxygen component in the zirconium boride particles is not less than 1.1 mass % and not more than 1.4 mass %. When the content of the oxygen component is less than 1.1 mass %, the zirconium boride particles rapidly dissolve into the non-aqueous electrolytic solution and constitute resistance so that the cycle characteristic deteriorates. When the content of the oxygen component is more than 1.4 mass %, the zirconium boride particles would not sufficiently dissolve into the non-aqueous electrolytic solution so that the cycle characteristic deteriorates. From the viewpoint of improving the cycle characteristic, the content of the oxygen component is preferably not less than 1.19 mass % and not more than 1.38 mass %, more preferably not less than 1.25 mass % and not more than 1.35 mass %. The content of the oxygen component in the zirconium boride particles can be determined using, for example, an element analyzer which is based on a non-dispersive infrared absorption method, or the like.

The content of the zirconium boride particles relative to the lithium transition metal complex oxide particles is, as zirconium, not less than 0.25 mol % and not more than 2.2 mol %. When that content is less than 0.25 mol %, the amount of zirconium boride particles dissolving into the non-aqueous electrolytic solution is small. Therefore, the effect of trapping fluoride ions is not sufficient, so that the cycle characteristic deteriorates. When the above content is more than 2.2 mol %, the amount of zirconium boride particles dissolving into the non-aqueous electrolytic solution is excessive, and the zirconium boride particles constitute resistance so that the cycle characteristic deteriorates. From the viewpoint of maintaining excellent cycle characteristic, the content of the zirconium boride particles is preferably not less than 0.3 mol % and not more than 2.1 mol %, more preferably not less than 0.4 mol % and not more than 2.0 mol %.

The average particle diameter of the zirconium boride particles is, for example, not less than 1 μm and not more than 5 μm, preferably not less than 2.5 μm and not more than 4 μm, from the viewpoint of the cycle characteristic.

The zirconium boride particles which contain oxygen may be a commercially-available product or may be obtained by performing a heat treatment on zirconium boride particles in an oxygen-containing atmosphere. The cycle characteristic has a tendency to further improve when the zirconium boride particles obtained by the heat treatment are used.

When the zirconium boride particles which contain oxygen are prepared by a heat treatment, the content of the oxygen component depends on the temperature of the heat treatment as will be described later. The heat treatment temperature is preferably not less than 270° C. and not more than 380° C., more preferably not less than 320° C. and not more than 370° C.

As described above, it is estimated that the zirconium boride particles dissolve into the non-aqueous electrolytic solution and then suppress deterioration of the cycle characteristic, and that the zirconium boride particles do not directly react with the positive electrode active material. Therefore, it is preferred that, in the positive electrode material, the zirconium boride particles and the lithium transition metal complex oxide particles each exist as a substantially independent particles. It is estimated that, when existing as an independent particles, the dissolution of the zirconium boride particles into the non-aqueous electrolytic solution is enhanced without a reaction with the lithium transition metal complex oxide particles. Herein, being contained "as a substantially independent particles" means that, for example, neither fusion of the zirconium boride particles and the lithium transition metal complex oxide particles nor integration by sintering of the zirconium boride particles and the lithium transition metal complex oxide particles is observed. Specifically, it means that, for example, when the average particle diameter of the zirconium boride particles is different from the average particle diameter of the lithium transition metal complex oxide particles, a peak resulting from the heat-treated particles and a peak resulting from the lithium transition metal complex oxide particles are observed in the granularity distribution of the positive electrode composition. Further, by element mapping with the use of, for example, a scanning electron microscope-energy dispersive X-ray spectroscopic analyzer unit, it can be observed that the heat-treated particles and the lithium transition metal complex oxide particles are each contained as substantially independent particles.

[Other Additives]

The positive electrode material for non-aqueous secondary batteries may contain, in addition to the positive electrode active material and the zirconium boride particles, other materials commonly used in composition of the positive electrode material. Specifically, the positive electrode material may contain an electrical conduction assisting agent, a binder, a solvent, etc.

[Effects and Other Factors]

The positive electrode material for non-aqueous secondary batteries of the present disclosure includes oxygen with the content of the oxygen component in the zirconium boride particles being not less than 1.1 mass % and not more than 1.4 mass %. Due to the contained oxygen, the rate of dissolution of the zirconium boride particles into the non-aqueous electrolytic solution is adjusted such that the zirconium boride particles gradually dissolve into the non-aqueous electrolytic solution. The dissolved zirconium boride captures fluoride ions which are products of decomposition derived from the electrolyte or the like in the non-aqueous electrolytic solution by repetition of the charge/discharge cycles. Accordingly, a reaction between the fluoride ions and the positive electrode active material can be suppressed, so that deterioration in cycle characteristic of the positive electrode active material can be suppressed.

In Japanese Laid-Open Patent Publication No. 2012-048838, boride particles are mixed with lithium transition metal oxide particles and thereafter heated so as to react with a lithium compound contained in the lithium-containing transition metal oxide and to be sintered at the surface of the lithium transition metal oxide. The resultant product functions as an electrical conduction assisting agent, so that the output characteristic is improved. On the other hand, the amount of the resultant product dissolved into the electrolyte is small as compared with the zirconium boride of the present application, and therefore, fluoride ions in the electrolyte for maintaining the cycle characteristic cannot be sufficiently captured. Thus, the zirconium boride particles disclosed in Japanese Laid-Open Patent Publication No. 2012-048838 are totally different in both the state of existence and the function from the oxygen-containing zirconium boride particles which are contained in the positive electrode material for non-aqueous secondary batteries of the present disclosure.

(Non-Aqueous Secondary Battery)

The non-aqueous secondary battery of the present disclosure includes a positive electrode, a negative electrode, and a non-aqueous electrolytic solution.

The positive electrode includes the above-described positive electrode material for non-aqueous secondary batteries. Specifically, the positive electrode includes a current collector and a positive electrode mixture layer supported by the current collector. The positive electrode mixture layer contains the above-described positive electrode material for non-aqueous secondary batteries, an electrical conduction assisting agent, a binder, etc.

The negative electrode includes a negative electrode active material. Specifically, the negative electrode includes a current collector and a negative electrode mixture layer supported by the current collector. The negative electrode mixture layer contains a negative electrode active material, an electrical conduction assisting agent, a binder, etc.

The positive electrode and the negative electrode are arranged with a separator interposed therebetween. Other than the above-described positive electrode material for non-aqueous secondary batteries, the positive electrode, the negative electrode, and the separator can be produced using materials and production method which are commonly used for non-aqueous secondary batteries.

The non-aqueous electrolytic solution includes a non-aqueous solvent and an electrolyte which contains an anion which has fluorine. Examples of the non-aqueous solvent includes a cyclic carbonate ester solvent, a chain carbonate ester solvent, a cyclic ether solvent, a chain ether solvent, a cyclic ester solvent, a chain ester solvent, and fluorinated solvents thereof.

The electrolyte contains an anion which has fluorine. Specifically, a lithium salt which contains an anion which has fluorine, such as $LiPF_6$, $LiBF_4$, $LiSbF_6$, $LiAsF_6$, $LiSO_3CF_3$, $LiN(SO_2CF_3)_2$, can be solely used, or two or more of such lithium salts can be used together. An electrolyte which is different from the lithium salt may be contained.

According to the non-aqueous secondary battery of the present disclosure, the non-aqueous electrolytic solution contains an anion which has fluorine. When the non-aqueous secondary battery is repeatedly charged and discharged at a high charging voltage of, for example, not less than 4.44 V, the anion which has fluorine in the electrolyte gradually decomposes due to a voltage applied for charging of the battery. However, fluoride ions produced by the decomposition react with zirconium boride dissolved in the non-aqueous electrolytic solution to produce $BF_4^-$ ions, or the like, and are thereby captured. Therefore, the reaction of the fluoride ions with the positive electrode active material is suppressed.

(Method for Producing Positive Electrode Material for Non-Aqueous Secondary Batteries)

A method for producing a positive electrode material for non-aqueous secondary batteries according to the present embodiment includes the step of obtaining heat-treated particles and the step of obtaining a positive electrode material for non-aqueous secondary batteries. The following description mainly focuses on these steps.

[Step of Obtaining Heat-Treated Particles]

In the step of obtaining heat-treated particles, zirconium boride particles are heat treated in an oxygen-containing atmosphere, whereby heat-treated particles are obtained. This step is carried out solely with zirconium boride particles before mixing the zirconium boride particles with a positive electrode active material which contains lithium transition metal complex oxide particles. The surface of the zirconium boride particles before the heat treatment has, for example, a very thin layer of zirconium oxide. It is estimated that, after the heat treatment in the oxygen atmosphere, the heat-treated particles have a thicker layer of titanium oxide at the surface. In the case where a positive electrode material which contains the thus-obtained heat-treated particles is used, excellent cycle characteristic can be maintained when used under a high voltage condition, for example, with the charging voltage of not less than 4.44 V.

The purity of zirconium boride particles which are subjected to the heat treatment is, for example, not less than 95 mass %, preferably not less than 98 mass %, from the viewpoint of safety. As described above, the average particle diameter of the zirconium boride particles is, for example, not less than 1 μm and not more than 5 μm, preferably not less than 2.5 μm and not more than 4 μm.

The oxygen-containing atmosphere only needs to contain oxygen. For example, the oxygen content in the oxygen-containing atmosphere is not less than 10 volume %, preferably not less than 20 volume %. The upper limit is not particularly limited. The oxygen-containing atmosphere may contain only oxygen except for the other inevitable gases produced during the producing process. From the viewpoint of productivity and safety, the oxygen-containing atmosphere may contain other gases than oxygen. Examples of the other gases than oxygen include inert gasses, such as nitrogen, argon, etc. The oxygen-containing atmosphere is preferably the air atmosphere from the viewpoint of productivity.

The heat treatment temperature is not less than 220° C. and not more than 390° C. When the heat treatment temperature is less than 220° C., the heat-treated zirconium boride particles rapidly dissolve into the non-aqueous electrolytic solution and constitute resistance so that the cycle characteristic deteriorates. When the heat treatment temperature is more than 390° C., the heat-treated zirconium boride particles would not sufficiently dissolve into the non-aqueous electrolytic solution so that the cycle characteristic deteriorates. From the viewpoint of improving the cycle characteristic, the heat treatment temperature is preferably not less than 270° C. and not more than 380° C., more preferably not less than 320° C. and not more than 370° C.

The duration of the heat treatment may be set such that the content of the oxygen component in the resultant zirconium boride particles is, for example, not less than 1.1 mass % and not more than 1.4 mass %. For example, the duration of the heat treatment is not less than 5 hours and not more than 15 hours. The heat treatment of the zirconium boride particles is carried out using, for example, a box furnace.

Through the step of the present disclosure, heat-treated particles, having the content of the oxygen component in the zirconium boride particles not less than 1.1 mass % and not more than 1.4 mass %, are obtained. Note that the content of the oxygen component in commercially-available zirconium boride particles on which a heat treatment is not performed is about 1.07 mass %.

<Step of Obtaining Positive Electrode Material for Non-Aqueous Secondary Batteries>

In the step of obtaining a positive electrode material for non-aqueous secondary batteries, the obtained heat-treated particles are mixed with a specific positive electrode active material in a specific ratio, whereby an intended positive electrode material for non-aqueous secondary batteries is obtained.

[Mixture Ratio]

As described above, the content of the heat-treated particles relative to the lithium transition metal complex oxide particles is, as zirconium, not less than 0.25 mol % and not more than 2.2 mol % from the viewpoint of cycle characteristic. The content is preferably not less than 0.3 mol % and not more than 2.1 mol %, more preferably not less than 0.4 mol % and not more than 2.0 mol %.

[Mixing Method]

The mixing method is not particularly limited so long as the heat-treated particles and the positive electrode active material are prevented from causing a chemical reaction or undergoing physical changes due to application of mechanical or thermal energy. For example, a known blade mixer can be used in mixing the heat-treated particles and the positive electrode active material. In this case, the resultant positive electrode material for non-aqueous secondary batteries contains the zirconium boride particles and the lithium transition metal complex oxide particles as substantially independent particles as described above.

EXAMPLES

Positive electrode materials for non-aqueous secondary batteries were produced under various conditions, and the characteristics of the produced positive electrode materials were examined. The results of the examination will be described below. Note that each of the average particle diameter of the lithium transition metal complex oxide particles and the average particle diameter of the zirconium boride particles is represented by a value corresponding to the volume accumulation of 50% in a volume distribution obtained by a laser scattering method. Specifically, the average particle diameter was measured using TIB2-NF manufactured by JAPAN NEW METALS CO., LTD. The content of the oxygen component in the zirconium boride particles (oxygen content) was measured using an oxygen and nitrogen analyzer (EMGA-820 manufactured by HORIBA, Ltd.).

1. Manufacture of Positive Electrode Material for Non-Aqueous Secondary Batteries Example 1

Zirconium boride particles whose average particle diameter was 2.9 μm were heat treated in air at 250° C. for 10 hours, whereby heat-treated particles were obtained. The content of the oxygen component in the heat-treated particles was 1.14 mass %.

Cobalt hydroxide was obtained by coprecipitation. The obtained cobalt hydroxide was mixed with lithium carbonate such that the molar ratio was Li:Co=1:1, whereby a source material mixture was obtained. The obtained source material mixture was baked at 1080° C. for 6 hours in the air atmosphere, whereby a sintered mixture was obtained. The sintered mixture was crushed and put through a dry sieve, whereby a positive electrode active material, including lithium transition metal complex oxide particles which were represented by composition formula $Li_{1.02}Co_{1.0}O_2$ and whose average particle diameter was 27 μm, was obtained.

The obtained heat-treated particles and the obtained positive electrode active material were mixed together using a high speed shear mixer such that the content of the heat-treated particles relative to the lithium transition metal complex oxide was, as zirconium, 0.5 mol %, whereby the positive electrode material for non-aqueous secondary batteries of Example 1 was produced.

Example 2

The positive electrode material for non-aqueous secondary batteries of Example 2 was produced through the same procedure as that of Example 1 except that the heat treatment temperature for the zirconium boride particles was 300° C. The content of the oxygen component in the heat-treated zirconium boride particles was 1.2 mass %.

Example 3

The positive electrode material for non-aqueous secondary batteries of Example 3 was produced through the same procedure as that of Example 1 except that the heat treatment temperature for the zirconium boride particles was 350° C. The content of the oxygen component in the heat-treated zirconium boride particles was 1.27 mass %.

Example 4

The positive electrode material for non-aqueous secondary batteries of Example 4 was produced through the same procedure as that of Example 1 except that the heat treatment temperature for the zirconium boride particles was 360° C.

Example 5

The positive electrode material for non-aqueous secondary batteries of Example 5 was produced through the same procedure as that of Example 1 except that the heat treatment temperature for the zirconium boride particles was 370° C.

Example 6

The positive electrode material for non-aqueous secondary batteries of Example 6 was produced through the same procedure as that of Example 1 except that the heat treatment temperature for the zirconium boride particles was 380° C.

Example 7

The positive electrode material for non-aqueous secondary batteries of Example 7 was produced through the same procedure as that of Example 1 except that the heat treatment temperature for the zirconium boride particles was 390° C.

Example 8

The positive electrode material for non-aqueous secondary batteries of Example 8 was produced through the same procedure as that of Example 1 except that the heat treatment temperature for the zirconium boride particles was 360° C. and that the content of the heat-treated particles relative to the lithium transition metal complex oxide was, as zirconium, 0.25 mol %.

Example 9

The positive electrode material for non-aqueous secondary batteries of Example 9 was produced through the same procedure as that of Example 1 except that the heat treatment temperature for the zirconium boride particles was 360° C. and that the content of the heat-treated particles relative to the lithium transition metal complex oxide was, as zirconium, 1 mol %.

Example 10

The positive electrode material for non-aqueous secondary batteries of Example 10 was produced through the same procedure as that of Example 1 except that the heat treatment temperature for the zirconium boride particles was 360° C. and that the content of the heat-treated particles relative to the lithium transition metal complex oxide was, as zirconium, 1.5 mol %.

Example 11

The positive electrode material for non-aqueous secondary batteries of Example 11 was produced through the same procedure as that of Example 1 except that the heat treatment temperature for the zirconium boride particles was 360° C. and that the content of the heat-treated particles relative to the lithium transition metal complex oxide was, as zirconium, 2 mol %.

Comparative Example 1

The positive electrode material for non-aqueous secondary batteries of Comparative Example 1 was produced through the same procedure as that of Example 1 except that zirconium boride particles were not added.

Comparative Example 2

The positive electrode material for non-aqueous secondary batteries of Comparative Example 2 was produced through the same procedure as that of Example 1 except that the heat treatment temperature for the zirconium boride particles was 400° C. and that the content of the heat-treated particles relative to the lithium transition metal complex oxide was, as zirconium, 0.5 mol %.

Comparative Example 3

The positive electrode material for non-aqueous secondary batteries of Comparative Example 3 was produced through the same procedure as that of Example 1 except that the heat treatment temperature for the zirconium boride particles was 360° C. and that the content of the heat-treated particles relative to the lithium transition metal complex oxide was, as zirconium, 2.5 mol %.

Comparative Example 4

The positive electrode material for non-aqueous secondary batteries of Comparative Example 4 was produced through the same procedure as that of Example 1 except that the zirconium boride particles were not heat treated and that the content of the zirconium boride particles relative to the lithium transition metal complex oxide was, as zirconium, 0.5 mol %.

2. Production of Battery for Evaluation

Non-aqueous electrolyte secondary batteries for evaluation were produced through the procedure described below using the positive electrode materials for secondary batteries of Examples 1 to 11 and Comparative Examples 1 to 4.

[Production of Positive Electrode]

A positive electrode composition of 92 parts by mass, acetylene black of 3 parts by mass, and polyvinylidene fluoride of 5 parts by mass were dispersed in N-methylpyrrolidon, whereby a positive electrode slurry was obtained. The obtained positive electrode slurry was applied onto a current collector which was made of aluminum foil, and then dried and subjected to compression molding with a roll press machine. The resultant mass was cut into pieces of a predetermined size, whereby a positive electrode was obtained.

[Production of Negative Electrode]

Artificial graphite of 97.5 parts by mass, carboxymethylcellulose of 1.5 parts by mass, and styrene butadiene rubber of 1.0 parts by mass were dispersed in water, whereby a negative electrode slurry was obtained. The obtained negative electrode slurry was applied onto a current collector which was made of copper foil, and then dried and subjected to compression molding with a roll press machine. The resultant mass was cut into pieces of a predetermined size, whereby a negative electrode was obtained.

[Production of Non-Aqueous Electrolytic Solution]

Ethyl carbonate and methylethyl carbonate were mixed at the volume ratio of 3:7, whereby a mixture solvent was obtained. Lithium hexafluorophosphate was dissolved into the obtained mixture solvent such that its concentration was 1.0 mol %, whereby a non-aqueous electrolytic solution was obtained.

[Preparation of Separator]

A separator which was made of porous polyethylene was prepared.

[Assemblage of Non-Aqueous Electrolyte Secondary Battery]

Lead electrodes were respectively attached to the current collectors of the above-described positive electrode and negative electrode, and the positive electrode and the negative electrode were dried in vacuum at 120° C. Then, the above-described separator was interposed between the positive electrode and the negative electrode, and these components were put into a laminate pack in the form of a bag. After the components were put into the laminate pack, the laminate pack was dried in vacuum at 60° C., whereby moisture adsorbed by the respective components was removed. After the laminate pack was dried in vacuum, the above-described non-aqueous electrolytic solution was poured into the laminate pack, and the laminate pack was sealed, whereby a laminate-type non-aqueous electrolyte secondary battery was obtained as a battery for evaluation. The obtained battery for evaluation was used in evaluation as to the battery characteristics.

[Evaluation as to Cycle Characteristic]

The battery for evaluation was placed in a constant temperature chamber at 45° C. and subjected to constant voltage charging at the charging voltage of 4.44 V. After having been charged, the battery was subjected to constant voltage discharging at the discharging voltage of 2.75 V, and the discharging capacity in the first cycle, Qdcyc(1), was measured. Subsequently, charging and discharging were repeated, and lastly, the discharging capacity in the 100th cycle, Qcyc(100), was measured. From the obtained values of Qcyc(1) and Qcyc(100), the capacity maintenance rate after 100 cycles, Pcyc(=Qcyc(100)/Qcyc(1)), was calculated.

Table 1 shows the heat treatment temperature and the content of the zirconium boride particles and the cycle characteristic (i.e., capacity maintenance rate) of the batteries for evaluation at the time of production of the positive electrode materials for non-aqueous secondary batteries of Examples 1 to 11 and Comparative Examples 1 to 4. Table 2 shows the heat treatment temperature for the zirconium boride particles and the content of the oxygen component at the time of production of the positive electrode materials for non-aqueous secondary batteries of Examples 1, 2 and 3 and Comparative Examples 2 and 4.

TABLE 1

| Sample | Heat Treatment Temperature for $ZrB_2$ (° C.) | Content of $ZrB_2$ (mol %) | Capacity Maintenance Rate (%) |
|---|---|---|---|
| Example 1 | 250 | 0.5 | 67 |
| Example 2 | 300 | | 69 |
| Example 3 | 350 | | 73 |
| Example 4 | 360 | | 73 |
| Example 5 | 370 | | 71 |
| Example 6 | 380 | | 68 |
| Example 7 | 390 | | 65 |
| Example 8 | 360 | 0.25 | 65 |
| Example 9 | | 1 | 74 |
| Example 10 | | 1.5 | 73 |
| Example 11 | | 2 | 69 |
| Comparative Example 1 | — | — | 61 |
| Comparative Example 2 | 400 | 0.5 | 62 |
| Comparative Example 3 | 360 | 2.5 | 51 |
| Comparative Example 4 | — | 0.5 | measurement failed* |

Note
*Measurement failed due to short-circuit in battery for evaluation.

TABLE 2

| Sample | Oxygen Content (mass %) | Heat Treatment Temperature (° C.) |
|---|---|---|
| Example 1 | 1.14 | 250 |
| Example 2 | 1.20 | 300 |
| Example 3 | 1.27 | 350 |
| Comparative Example 2 | 1.47 | 400 |
| Comparative Example 4 | 1.07 | none |

As seen from the results of Comparative Example 1 and Comparative Example 4, when zirconium boride particles on which a heat treatment is not performed are added to a positive electrode material for non-aqueous secondary batteries, the cycle characteristic (i.e., capacity maintenance rate) deteriorates as compared with a case where the zirconium boride particles are not added. This is probably because the zirconium boride particles on which a heat treatment is not performed are likely to dissolve into a non-aqueous electrolytic solution and cause adverse effects on the battery characteristic. As seen from the results of Examples 1 to 7 and Comparative Example 2, when the heat treatment temperature exceeds 390° C., the cycle characteristic deteriorates. Likewise, as seen from the results of Examples 8 to 11 and Comparative Example 3, when the content of the zirconium boride particles is not less than 2.5 mol %, the cycle characteristic deteriorates. It can be seen from these results that, when zirconium boride particles which have been heat treated in an appropriate temperature range are mixed with lithium transition metal complex oxide particles at a predetermined ratio, a non-aqueous secondary battery which has excellent cycle characteristic can be realized.

Figure 1:
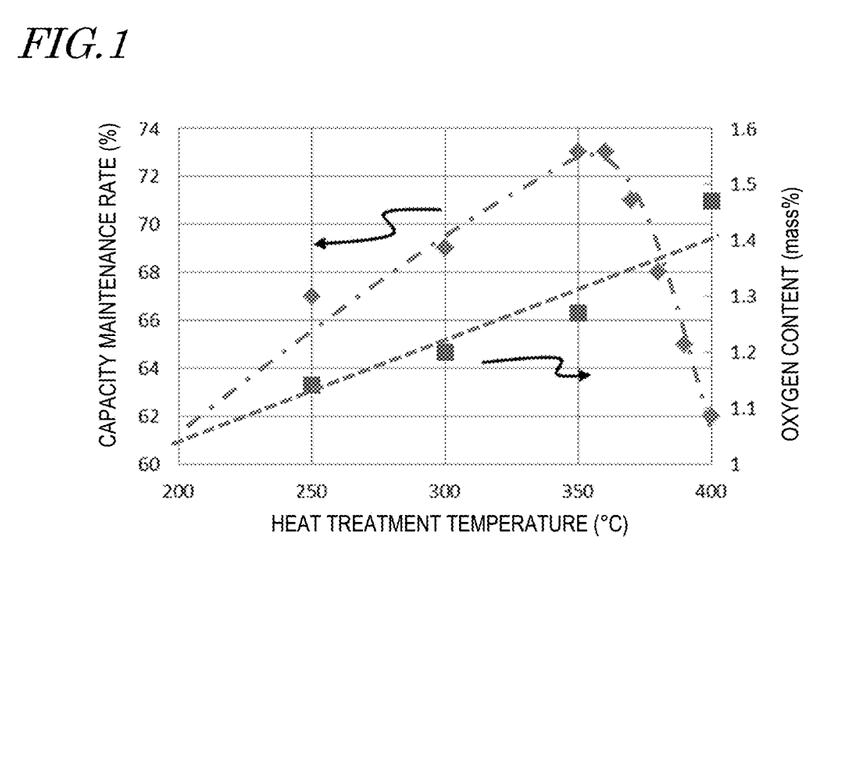
FIG. 1 shows an example relationship between the heat treatment temperature for zirconium boride particles and the capacity maintenance rate and the oxygen content in zirconium boride.
Figure 2:
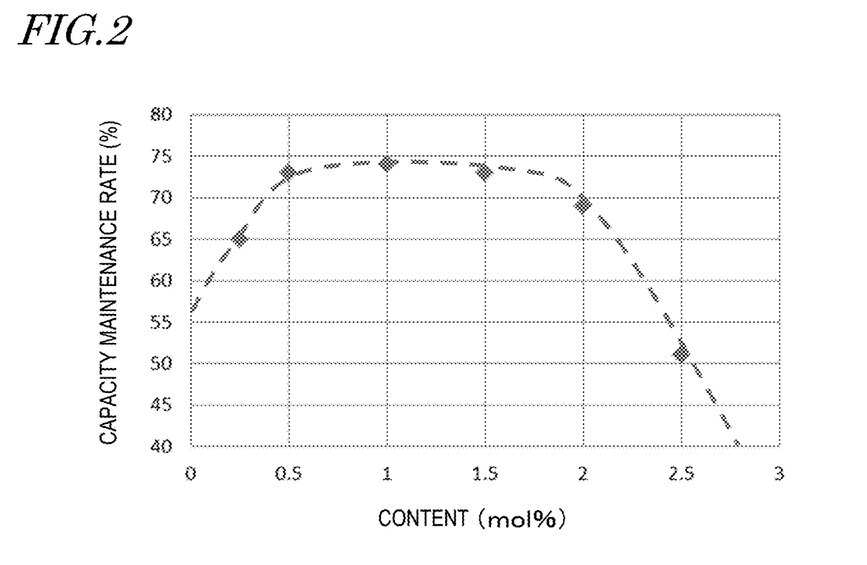
FIG. 2 shows an example of the relationship between the content of zirconium boride particles and the capacity maintenance rate.

FIG. 1 shows the relationship between the heat treatment temperature and the cycle characteristic (i.e., capacity maintenance rate) and the oxygen content in zirconium boride in the case where the content of zirconium boride is 0.5 mol % relative to the lithium transition metal complex oxide particles. FIG. 2 shows the relationship between the content of zirconium boride particles and the cycle characteristic in the case where the heat treatment temperature for zirconium boride particles is 360° C. 0.5 mol % is a content in the most preferred range of the content of zirconium boride. 360° C. is a heat treatment temperature in the most preferred range of the heat treatment temperature.

As seen from FIG. 1, in the heat treatment temperature range of not less than 220° C. and not more than 390° C., a capacity maintenance rate of not less than 63% is achieved. In the heat treatment temperature range of not less than 270° C. and not more than 380° C., a capacity maintenance rate of not less than 67% is achieved. In the heat treatment temperature range of not less than 320° C. and not more than 370° C., a capacity maintenance rate of not less than 71% is achieved.

It can be seen that the content of the oxygen component in zirconium boride is generally proportional to the heat treatment temperature. In the heat treatment temperature range of not less than 220° C. and not more than 390° C., the content of the oxygen component in zirconium boride is not less than 1.1 mass % and not more than 1.4 mass %. In the temperature range of not less than 270° C. and not more than 380° C., the content of the oxygen component in zirconium boride is not less than 1.19 mass % and not more than 1.38 mass %. In the temperature range of not less than 320° C. and not more than 370° C., the content of the oxygen component in zirconium boride is not less than 1.25 mass % and not more than 1.35 mass %.

As seen from FIG. 2, when the content of the zirconium boride particles relative to the lithium transition metal complex oxide particles is, as zirconium, in the range of not less than 0.25 mol % and not more than 2.2 mol %, a capacity maintenance rate of not less than 63% is achieved. When the content is in the range of not less than 0.3 mol % and not more than 2.1 mol %, a capacity maintenance rate of not less than 67% is achieved. When the content is in the range of not less than 0.4 mol % and not more than 2.0 mol %, a capacity maintenance rate of not less than 71% is achieved.

As described above, it can be estimated that, in a non-aqueous secondary battery of the present disclosure, excellent cycle characteristic depends on capture of fluoride ions by boron of the zirconium boride particles. Occurrence of this function is not limited to a case where the positive electrode active material used contains lithium transition metal complex oxide particles represented by composition formula $Li_{1.02}Co_{1.0}O_2$, which is exemplarily used in this example. It is estimated that the same effects can be achieved so long as the positive electrode active material used contains lithium transition metal complex oxide particles in the range of various compositions which have been described above.

When a positive electrode material for non-aqueous secondary batteries which is obtained according to an embodiment of the present disclosure is used, a non-aqueous secondary battery which exhibits excellent cycle characteristics at high voltages can be obtained. Thus, the obtained non-aqueous secondary battery is suitably applicable to large-sized machines which are required to have high power and high energy density, such as electric vehicles.

While exemplary embodiments of the present invention have been described, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

What is claimed is:

1. A method for producing a positive electrode material for non-aqueous secondary batteries, comprising:
performing a heat treatment on zirconium boride particles in an oxygen-containing atmosphere at a heat treatment temperature of not less than 220° C. and not more than 390° C., thereby obtaining heat-treated particles; and
mixing the heat-treated particles with a positive electrode active material comprising lithium transition metal complex oxide particles that comprise at least one of cobalt and nickel in a composition thereof and have a layered structure, such that a zirconium content in the heat-treated particles relative to a molar amount of the lithium transition metal complex oxide in the lithium transition metal complex oxide particles is not less than 0.25 mol % and not more than 2.2 mol %, thereby obtaining a positive electrode material for non-aqueous secondary batteries,
wherein an oxygen content in the heat-treated particles is not less than 1.1 mass % and not more than 1.4 mass %.

2. The method of claim 1, wherein the heat treatment temperature is not less than 270° C. and not more than 380° C.

3. The method of claim 2, wherein the heat treatment temperature is not less than 320° C. and not more than 370° C.

4. The method of claim 1, wherein the zirconium content is not less than 0.3 mol % and not more than 2.1 mol %.

5. The method of claim 4, wherein the zirconium content is not less than 0.4 mol % and not more than 2.0 mol %.

6. The method of claim 1, wherein the lithium transition metal complex oxide particles and the zirconium boride particles are each present as substantially independent particles in the positive electrode material to be obtained.

7. The method of claim 1, wherein the lithium transition metal complex oxide particles have a composition represented by formula (1):

$$Li_aNi_xCo_yM1_zM2_wO_2 \qquad (1)$$

where $0.95 \leq a \leq 1.5$, $0 \leq x \leq 1$, $0 \leq y \leq 1$, $x+y \neq 0$, $0 \leq z \leq 0.35$, $0 \leq w \leq 0.02$, $x+y+z+w \leq 1$, M1 is at least one element selected from the group consisting of Al and Mn, and M2 is at least one element selected from the group consisting of Mg, Ti, Zr, W, Ta, Nb and Mo.

* * * * *